United States Patent [19]

Kovats

[11] 4,155,444
[45] May 22, 1979

[54] CONVEYOR BELT SLAT LINK

[75] Inventor: Lawrence H. G. Kovats, Mentor, Ohio

[73] Assignee: Mayfran, Div. of Fischer Industries, Inc., Cleveland, Ohio

[21] Appl. No.: 912,329

[22] Filed: Jun. 5, 1978

Related U.S. Application Data

[60] Division of Ser. No. 847,325, Oct. 31, 1977, Pat. No. 4,128,166, which is a continuation of Ser. No. 718,111, Aug. 27, 1976, abandoned.

[51] Int. Cl.$^2$ .............................................. B65G 17/10
[52] U.S. Cl. ...................................... 198/822; 198/853
[58] Field of Search ............... 198/820, 822, 850, 851, 198/853

[56] References Cited

U.S. PATENT DOCUMENTS

| | | | |
|---|---|---|---|
| 1,854,506 | 4/1932 | Drake | 198/853 |
| 1,883,528 | 10/1932 | Buck | 198/853 |
| 2,681,728 | 6/1954 | Boron | 198/851 |
| 2,987,167 | 6/1961 | Franz | 198/853 |
| 3,770,106 | 11/1973 | Kuehl et al. | 198/853 |

Primary Examiner—Robert B. Reeves
Assistant Examiner—Jeffrey V. Nase
Attorney, Agent, or Firm—Meyer, Tilberry & Body

[57] ABSTRACT

A slat link for endless conveyor belts for heavy materials handling has a central transverse reinforcing beam and slat link covers surrounding the transverse reinforcing beam which converge to either side of the beam at a point intermediate the vertical distance between the top and bottom portions of the beam. Material loaded on top of the conveyor slat links contacts the higher portion of the slat link at the portion of the slat link where the beam is located, the beam acting to distribute the shock from the material loaded thereon along its links and to transmit such shock loadings to the conveyor support structure which absorbs the shock.

4 Claims, 3 Drawing Figures

CONVEYOR BELT SLAT LINK

This is a division of application Ser. No. 847,325, filed Oct. 31, 1977 (now U.S. Pat. No. 4,128,166), which is a continuation of application Ser. No. 718,111, filed Aug. 27, 1976, now abandoned.

The invention relates generally to the art of endless belt conveyor systems and more particularly to a heavy materials conveyor in which reinforced slat links travel on and work in conjunction with a track and track support system which is constructed so as to absorb shock generated through the dropping of heavy materials onto the endless conveyor belt.

BACKGROUND OF THE INVENTION

There has long been a problem with regard to wear and tear on heavy materials handling conveyors. Such conveyors are usually crane loaded and it is often the case that the crane operator will accidentally, or of necessity, drop heavy-weight materials which are to be conveyed onto the conveyor from a substantial height, thereby creating extreme impact forces. In the past, such conveyors have been rigidly supported so that the structure of the conveyor was forced to bear the entire shock of the dropping heavy weight. Further, former designs of slat links of the endless conveyor belt were not of a construction which could withstand such repeated abuse for extended periods of time. The structure of the conveyor would take a constant beating which would result in the damage of parts through bending, breaking or general loosening of the structure. Eventually, such conveyors would have to be either extensively overhauled or replaced entirely, both of which were extremely costly operations.

Accordingly, it is an object of this invention to provide a conveyor assembly for receiving and conveying heavyweight articles which incorporates various structures which tend to reduce or eliminate the damage due to wear and tear caused by dropping heavy material loadings through use of the conveyor in its intended manner.

It is a further object of this invention to provide a conveyor belt slat link which is reinforced in order to avoid damaging deformation from shock loading.

It is yet another object of this invention to provide a conveyor belt slat link having an internal I-beam which reinforces the slat link and causes shock loading from objects deposited thereon to be transferred through the I-beam to a support structure of the conveyor.

These and other objects of the invention will appear through a description of the preferred embodiment taken in conjunction with the accompanying drawings forming a part of this specification.

BRIEF DESCRIPTION OF THE DRAWINGS

While the invention may take physical form in a variety of parts and arrangements of parts, a preferred embodiment of the invention is shown in the drawings which are presented for the purposes of illustration and not limitation and show a conveyor slat link in accordance with the present invention in which.

DETAILED DESCRIPTION OF THE PREFERRED EMBODIMENT AND THE DRAWINGS

The same reference numbers are used to indicate identical parts throughout the description of the drawings.

Figure 1:
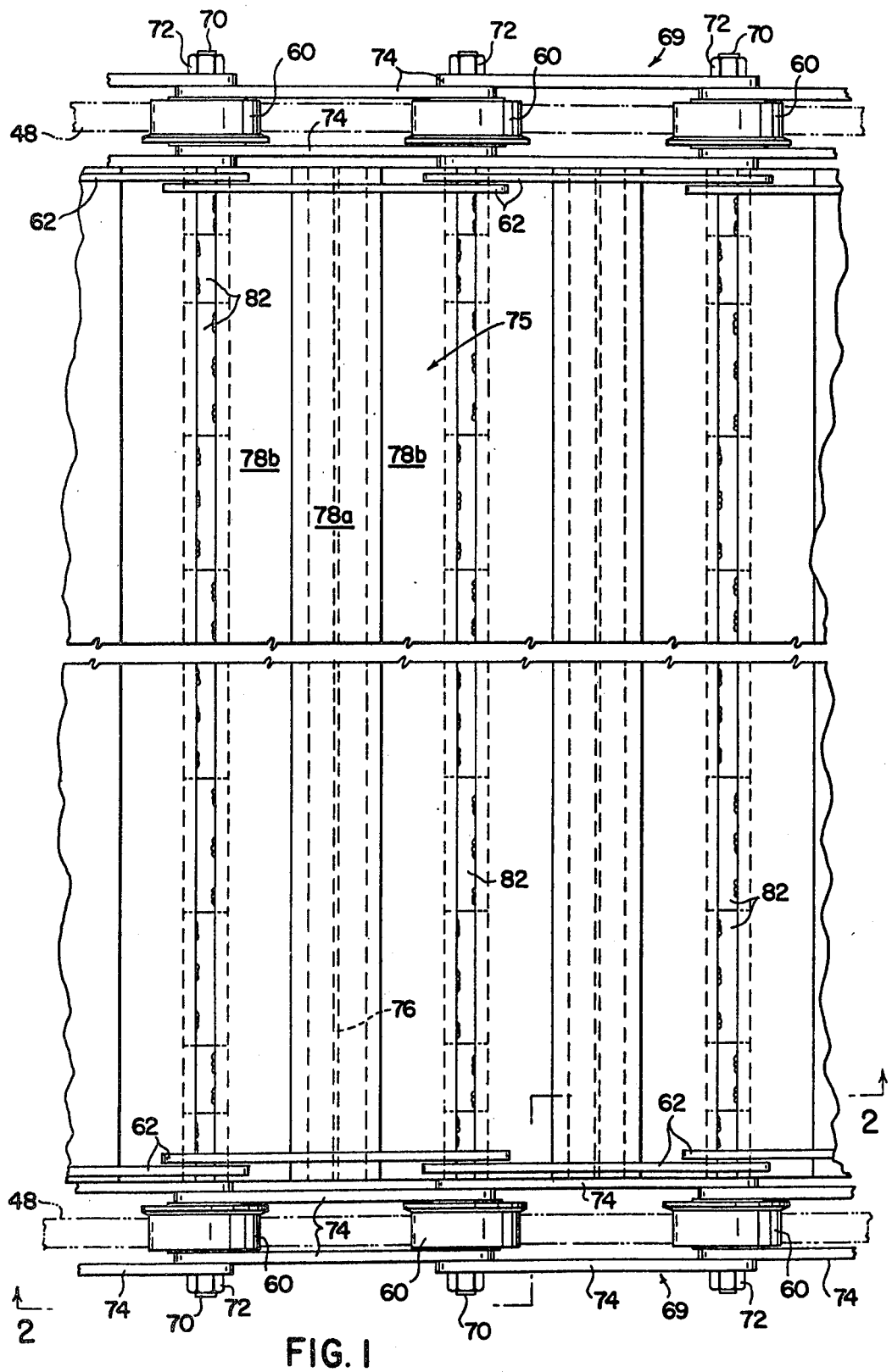
FIG. 1 is a top elevational view, partially in phantom of a portion of the conveyor belt assembly in accordance with the present invention.
Figure 2:
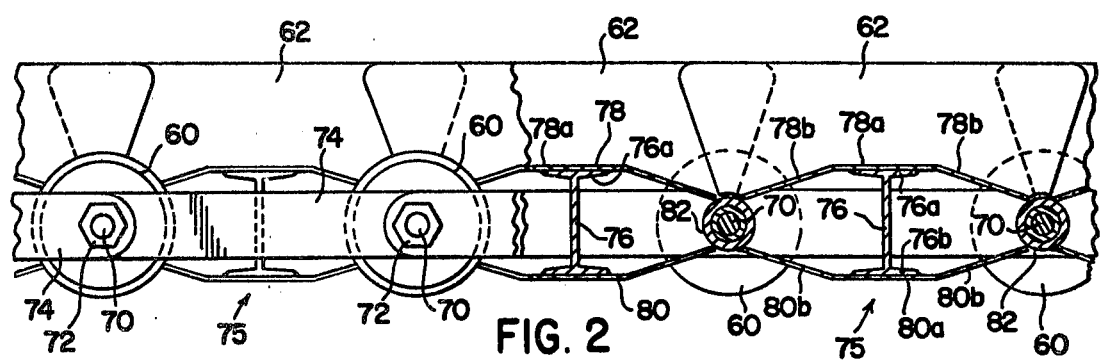
FIG. 2 is a side elevational view, partially in section of a portion of the conveyor belt as shown in FIG. 6 taken along line 2—2 thereof.
Figure 3:
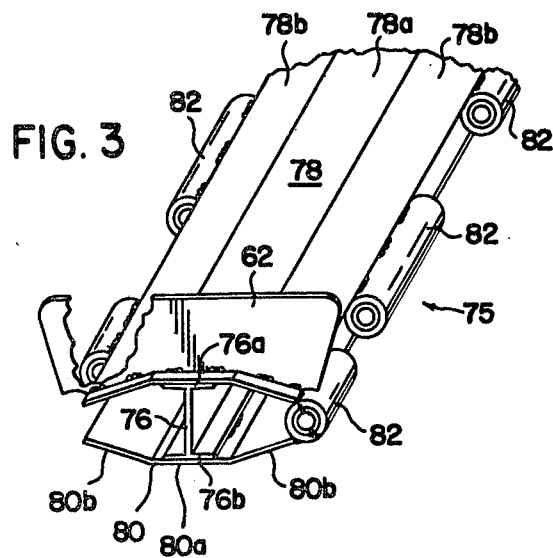
FIG. 3 is a perspective view of a single slat link constructed in accordance with a preferred embodiment of the present invention.

A portion of a conveyor belt 32 according to the present invention is shown in FIGS. 1, 2, and 3. Disposed along the side of the conveyor belt are rollers 60 which act to support the conveyor belt as it moves along the conveying track 48, the rollers 60 being mounted on transversely extending axles 70 interconnected by chain links 74 extending between adjacent axles 70 forming an endless chain 69. Fastening means such as nut 72 is used to hold chain links 74 onto the axles 70 at each chain roller 60. The conveyor belt is comprised of a series of load supporting slat links 75 extending between the extended axles 70 of the conveyor rollers 60 and transversely of the conveyor.

In accordance with the invention each slat link 75 is comprised of a transversely extending beam member 76, a top slat link cover 78, and a bottom slat link cover 80. Transverse beam member 76 is shown and described in the preferred embodiment as having an I-beam configuration. It will be understood, however, that transverse beam 76 may take any other form such as a T-beam, an L-beam, a channel beam or a rectangular beam.

Top slat link cover 78 is comprised of a top portion 78a passing across the top flange 76a of the I-beam member 76 and attached thereto in a plane parallel to the conveying direction. Portions 78b of the top slat link cover 78 extend angularly downwardly to the adjacent axle portions of the conveyor apparatus and are connected to a plurality of transversely spaced tubes 82 which extend transversely of the conveyor.

Similarly, a bottom slat link cover 80 is comprised of flat portion 80a attached along the bottom flange 76b of transverse I-beam 76. The flat portion 80a of bottom slat link cover 80 is in a plane parallel to the plane of portion 78a of the top slat link cover 78 and parallel to the conveying direction while portions 80b of bottom slat link cover 80 converge upwardly toward and are welded to tubes 82. The tubes 82 are spaced a distance approximately equal to their length and the tubes of one slat link 75 fit into corresponding spaces between the tubes 82 of the adjacent slat links. Axles 70 pass through the tubes when aligned to form an integrated endless belt structure.

Top and bottom slat link covers 78 and 80 are shown and described in the specification and claims as each being comprised of a single piece of metal. It will be understood, however that either or both of said covers may in practice be constructed from a plurality of pieces which are welded together to create the complete covers shown and described. For instance, top cover plate 78 may be constructed by providing two reverse-image half sections which are individually welded to flange 76a along its longitudinal center point above the web of I-beam 76 to create a top cover plate in accordance with the invention.

Side members 62 are located at the outward edges of each slat link 75 and extend from the load-supporting face of the top cover plate 78 in a plane parallel to the conveying direction A. Side members 62 are preferably attached to top slat link cover 78 by welding. The location of side members 62 on the outward ends of slat links 76 is such that there is an overlapping of adjacent side members 62 on adjacent slat links 75 in the completed conveyor belt 32, as is known in the art. In their preferred form, best shown in FIG. 7, side members 62 widen along the plane parallel to the conveying direction as they extend vertically so that their top edges overlap adjacent side members to a greater extent than the lower portions of the members. The provision of such upstanding members 62 helps to reduce spillage over edges of the belt 32 onto the roller chain 69 or the support structure.

Through the arrangement of the transverse I-beam 76 within the slat links 75, loadings placed upon the conveyor are supported primarily on the plane of flat portion 78a of the top slat link cover plate 78 because portions 78b extend downwardly away from this plane and the connections between adjacent slat links at tubes 82 are then somewhat protected from damage by material placed on the conveyor by being disposed generally below the plane of portions 78a. It can also be seen that shock loadings on the conveyor at flat portions 78a are distributed internally by the central transverse I-beam 76 rather than by the slat link cover portion. Thus, a slat link of lighter construction may be employed. It can be seen that shock loadings contacting the top surface of the conveyor at the plane defined by top slat link cover portion 78a are distributed outwardly through transverse I-beam 76 to chain rollers 60. The loading causes track 48 and its support blocks to move downwardly against the restraining force of resilient track support means for the track, such as disclosed in my aforementioned copending parent application Ser. No. 847,325 (now U.S. Pat. No. 4,128,166), which then resiliently absorbs the shock. Thus, damage is significantly reduced to the conveyor slat links and a corresponding reduction in maintenance and replacement expenses is realized when an endless conveyor belt comprised of slat links having transverse beams therein is used on a conveyor having a resilient support structure which resiliently absorbs shock loadings in the lateral, longitudinal and vertical directions.

While the invention has been described in the more limited aspects of a preferred embodiment and in conjunction with specific parts and arrangement of parts, other embodiments of the invention will occur to those skilled in the art, all of which are intended to be included within the scope of the present invention which is to be limited only by the scope of the appended claims as interpreted from the specification presented above.

What is claimed is:

1. A conveyor slat link comprising a central transverse beam, top and bottom cover plates spanning said beam and having flat central portions lying against and attached to the top and bottom surfaces, respectively, of said beam and tapered side portions extending laterally outward of said beam along each side thereof and converging toward each other in a direction outwardly away from said beam, and a plurality of spaced tubular members located at and attached to and joining the outer ends of the said converging tapered side portions away from said central portions, the tubular members at the respective sides of said transverse beam being disposed longitudinally along the length of said slat link parallel to said transverse beam and in longitudinally aligned spaced relation so that a second slat link having mating tubular members may be pivotally connected thereto by a single transversely extending axle shaft, the said side portions of said cover plates extending between the said tubular members and said beam at each side thereof converging outwardly of said beam to their junctures with said tubular members.

2. A conveyor slat link as described in claim 1 wherein a plurality of said slat links are pivotally connected together to form an endless conveyor belt.

3. A conveyor slat link as described in claim 1 in which said transverse beam is an I-beam and said cover plates have flat central portions lying flat against and attached to the flat surfaces of the top and bottom flanges of said I-beam, said tubular members and the junctures of said cover plates therewith being located entirely between and spaced from the planes of the said flat surfaces of the flanges on said I-beam.

4. A conveyor slat link as described in claim 1 in which said slat link further includes upstanding side members to retain conveyed material on said link.

* * * * *